United States Patent
Nickerson et al.

(10) Patent No.: US 7,513,968 B1
(45) Date of Patent: Apr. 7, 2009

(54) FABRICATION OF MAGNESIUM-TITANIUM TEMPLATE FOR A MAGNESIUM HYDROGEN PEROXIDE FUEL CELL

(75) Inventors: Earl S. Nickerson, Little Compton, RI (US); Maria G. Medeiros, Bristol, RI (US); Wayne C. Tucker, Exeter, RI (US); Russell R. Bessette, Mattapoisett, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 575 days.

(21) Appl. No.: 11/183,310

(22) Filed: Jul. 11, 2005

(51) Int. Cl.
*B29C 65/00* (2006.01)
*B44C 3/08* (2006.01)
*B32B 37/00* (2006.01)
*H01M 2/08* (2006.01)

(52) U.S. Cl. .................. 156/152; 156/219; 156/290; 156/291; 429/35

(58) Field of Classification Search .................. 156/60, 156/244.18, 244.27, 152, 219, 290, 291; 429/35
See application file for complete search history.

(56) References Cited

U.S. PATENT DOCUMENTS

| 4,729,162 A | 3/1988 | Him et al. |
| 4,939,051 A | 7/1990 | Yasuda et al. |
| 4,963,161 A | 10/1990 | Chi et al. |
| 5,527,363 A | 6/1996 | Wilkinson et al. |
| 5,858,569 A | 1/1999 | Meacher et al. |
| 6,106,967 A | 8/2000 | Virkar et al. |
| 6,514,296 B1 * | 2/2003 | Tsai et al. ................. 29/25.03 |
| 2005/0031933 A1 * | 2/2005 | Blunk et al. .................. 429/35 |

* cited by examiner

*Primary Examiner*—Tu B Hoang
*Assistant Examiner*—Ayub Maye
(74) *Attorney, Agent, or Firm*—James M. Kasischke; Jean-Paul A. Nasser; Michael P. Stanley

(57) ABSTRACT

Using a ¼ inch end mill a grid pattern of one inch squares or lands separated by concave troughs or grooves 0.025 inches deep is milled on to the surface of a one quarter inch thick magnesium plate. A conductive barrier such as a titanium foil is then laid over the magnesium plate, and is then pressed into the pattern with a one inch thick 80 durometer rubber sheet. Pressure of 250 pounds per square inch is then applied to the rubber to create indentations in the foil creating the same pattern as the one on the magnesium plate. The foil is then removed. An electrically conductive adhesive is then screen printed on the magnesium lands only, avoiding the grooves. The titanium foil is oriented to the pattern on the magnesium plate and mated to the magnesium plate by applying 200 pounds per square inch of pressure.

12 Claims, 1 Drawing Sheet

FABRICATION OF MAGNESIUM-TITANIUM TEMPLATE FOR A MAGNESIUM HYDROGEN PEROXIDE FUEL CELL

STATEMENT OF GOVERNMENT INTEREST

The invention described herein may be manufactured and used by or for the Government of the United States of America for governmental purposes without the payment of any royalties thereon or therefore.

CROSS REFERENCE TO OTHER RELATED APPLICATIONS

Not applicable.

BACKGROUND OF THE INVENTION (1) Field of the Invention

The present invention relates to electrochemical electrodes, and more specifically to a method of fabricating a magnesium titanium bipolar electrode.

(2) Description of the Prior Art

There continues to be a need for energy sources with a high energy density. In particular, there is a need for high energy density energy sources that can power unmanned undersea vehicles (UUVs). Such energy sources when used to power such vehicles are required to have an energy density greater than 400 Wh $kg^{-1}$. They also need to have long endurance and quiet operation. Additionally, they must be relatively inexpensive, environmentally friendly, safe to operate, reusable, capable of a long shelf life and not prone to spontaneous chemical or electrochemical discharge.

The zinc silver oxide (Zn/AgO) electrochemical couple has served as a benchmark energy source (at 100 Wh $kg^{-1}$) for undersea applications. Because of its low energy density, however, it is not suitable for unmanned undersea vehicles whose energy density requirements are four times those of the Zn/AgO electrochemical couple.

In an effort to fabricate power sources for unmanned undersea vehicle with increased energy density (over zinc-based power sources), research has been directed towards semi fuel cells (as one of several high energy density power sources being considered). Semi fuel cells normally consist of a metal anode, such as magnesium (Mg) and a catholyte such as hydrogen peroxide ($H_2O_2$). To achieve high energy, a multi-cell stack of semi fuel cells is required. This necessitates the use of bipolar electrodes. The electro-active components of a bipolar electrode are a catalyst cathode of palladium iridium on a substrate for the fast electrochemical reduction of hydrogen peroxide, electrically connected to a metal anode such as magnesium. Both halves of the bipolar electrode should be as physically close together as possible, while at the same time isolating the catalyst cathode and metal anode for the other's electrolyte. In order to accomplish isolation of the cathode and anode from the other's electrolyte, the bipolar electrode requires a chemically inert, nonporous, electronically conductive barrier between the metal anode and the catalyst cathode. One suitable material for such a barrier would be titanium metal. A titanium barrier would need to be in electrical contact with the catalyst cathode and the magnesium anode. Unfortunately, titanium and magnesium react differently under extreme thermal conditions making it difficult to bond a titanium barrier to a magnesium anode in such a way as to maintain electrical contact between the two surfaces over high temperatures for long durations. What is needed is a method of fabricating a magnesium-titanium template for a bipolar electrode such that the titanium barrier and the magnesium anode maintain electrical contact between the two surfaces under all operating conditions.

SUMMARY OF THE INVENTION

It is a general purpose and object of the present invention to provide a method of fabricating a bipolar electrode with a titanium barrier.

This object is accomplished by milling a one quarter inch thick magnesium plate using a 1 inch end mill set to 0.025 inches deep. The pattern milled into the plate forms a grid of one inch squares or lands that are separated by concave troughs or grooves. A titanium foil is then laid over the magnesium plate. The foil is then pressed into the magnesium grid with an 80 durometer rubber sheet that is one inch thick. Pressure of 250 pounds per square inch is then applied to the rubber to create indentations in the foil creating the same pattern as the one on the magnesium plate. The foil is then removed. An electrically conductive adhesive is then screen printed on the magnesium lands only. No adhesive is placed in the grooves. The titanium foil is oriented to the pattern on the magnesium plate and is mated to the magnesium plate using a pressure of 200 pounds per square inch.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF THE PREFERRED EMBODIMENT

Figure 1:
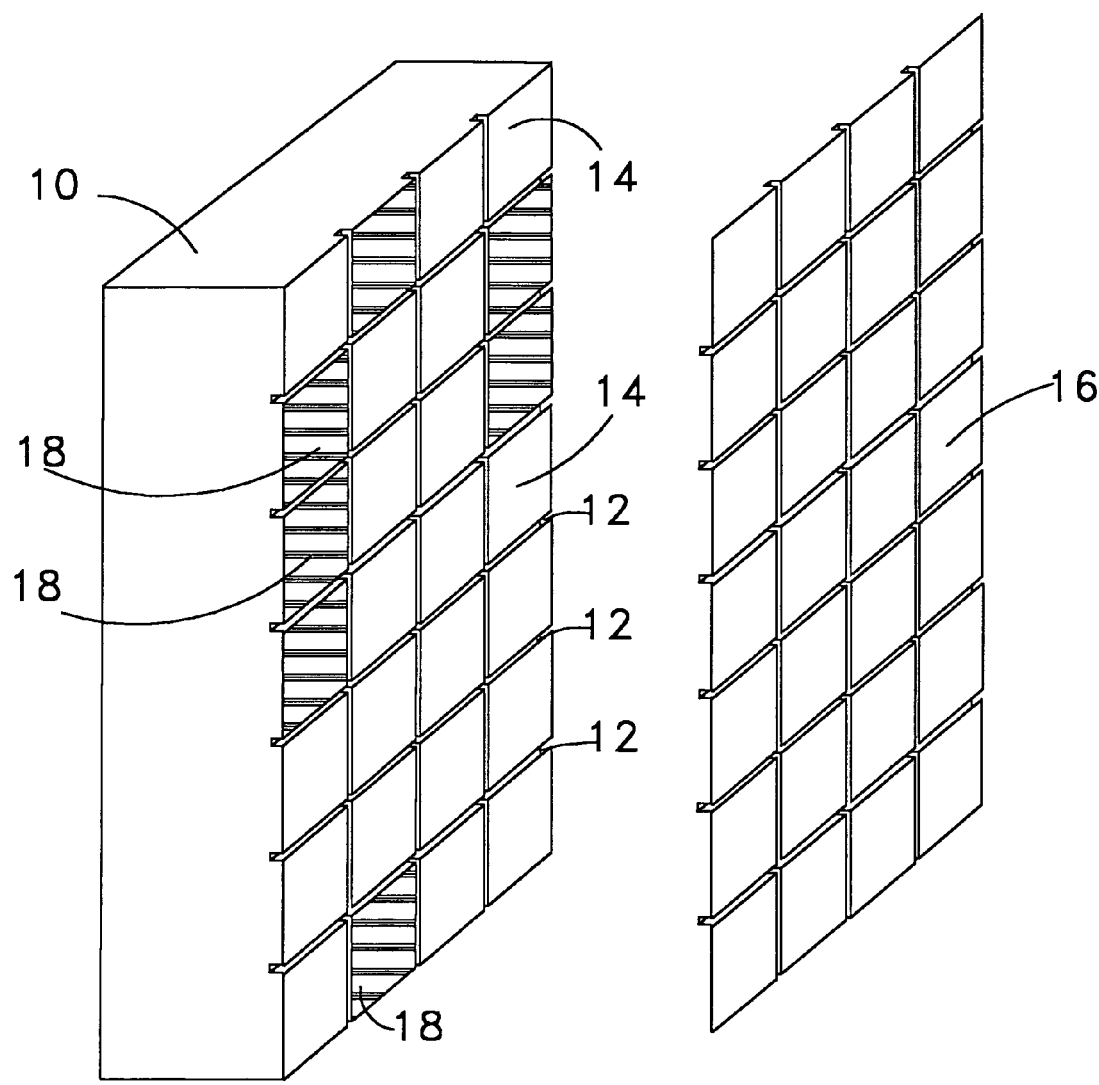
FIG. 1 is an exploded illustration of the components of the electrode according to the method of the present invention.

Referring now to FIG. 1 there is illustrated a magnesium plate 10 suitable for use as the anode of a bipolar electrode. The first step of the method is to mill the surface of the magnesium plate to a sufficient depth to create troughs or grooves 12 in the surface. In the preferred embodiment the pattern milled into the plate forms a grid of one inch squares or lands 14 that are separated by concave troughs or grooves 12. However, the method is not limited to such a pattern and could include a variety of geometric patterns.

The next step is to take titanium foil 16 and lay the foil over the milled surface of the magnesium plate 10. The next step is to apply pressure to the titanium foil 16 so that the pattern on the surface of the magnesium plate 10 is transferred to the foil 16. In the preferred embodiment, a one inch thick 80 durometer rubber sheet is placed over the titanium foil 16 first to protect the metal and distribute the force of pressure. Then, pressure of 250 pounds per square inch is then applied to the rubber.

The next step is to remove the foil 16 that is now imprinted with the same pattern as the magnesium plate. The next step is to apply a conductive adhesive 18 to the lands 14 of the milled surface of the magnesium plate. The adhesive 18 must be capable of maintaining adhesion when exposed to the electrolytes in a semi fuel cell. In the preferred embodiment the adhesive 18 is a conductive adhesive such as a silver epoxy. In the preferred embodiment, the application is accomplished by screen printing the adhesive 18. It is important that only the lands 14 and not the grooves 12 have adhesive applied to them.

The next step is to orient the titanium foil 16 so that the imprinted pattern on the foil 16 matches up with the milled pattern on the surface of the magnesium plate 10. The next step is to mate the oriented titanium foil 16 to the magnesium plate 10 and apply heat and pressure to the titanium foil 16 so that the adhesive 18 can bond the titanium foil 16 to the magnesium plate 10. In the preferred embodiment pressure is applied to the titanium foil 16 as described above, by covering the foil with a one inch thick 80 durometer rubber sheet and applying a pressure of 200 pounds per square inch to the rubber sheet.

The final step is to allow the adhesive 18 to cure either at room temperature or under thermally controlled conditions.

The advantage of the present invention over the prior art is that this method of fabricating an electrode allows two dissimilar metals to maintain electrical contact under thermal conditions that would cause incompatible thermal expansions. This is accomplished by only bonding the titanium to the lands on the surface of the milled magnesium plate while leaving the titanium in the grooves free of adhesive and therefore free to expand and take up three to four times its normal volume due to thermal expansion.

Obviously many modifications and variations of the present invention may become apparent in light of the above teachings. For example, various other patterns may be applied to generate the grooves and lands, several other metals (besides Ti) and or conductive barriers (such as carbon epoxies) can be used and several other conductive adhesives may be used to adhere the conductive barrier to the metal anode.

In light of the above, it is therefore understood that within the scope of the appended claims, the invention may be practiced otherwise than as specifically described.

What is claimed is:

1. A method of fabricating a bipolar electrode comprising the steps of:
   providing a metal plate suitable for use as the anode of a bipolar electrode;
   milling the surface of the metal plate to create lands and grooves in a geometric pattern in the surface;
   providing a conductive barrier suitable for use as a barrier between the metal plate and an electrolyte;
   laying the conductive barrier over the milled surface of the metal plate;
   applying pressure to the conductive barrier so that the pattern on the surface of the metal plate is pressed into the conductive barrier;
   removing the conductive barrier that is now imprinted with the same pattern as the metal plate;
   applying a conductive adhesive to the lands of the milled surface of the metal plate such that no adhesive is placed in the grooves;
   orienting the conductive barrier so that the imprinted pattern matches up with the milled pattern on the surface of the metal plate;
   mating the oriented conductive barrier to the metal plate;
   applying pressure to the conductive barrier so that the adhesive can bond to the metal plate; and
   curing the adhesive.

2. A method in accordance with claim 1 wherein said metal plate is a magnesium plate.

3. A method in accordance with claim 1 wherein said conductive barrier is a metal foil.

4. A method in accordance with claim 3 wherein said metal foil is a titanium foil.

5. A method in accordance with claim 1 wherein said pattern milled into the plate forms a grid of one inch square lands that are separated by concave grooves.

6. A method in accordance with claim 1 wherein the step of applying pressure to the conductive barrier further comprises:
   placing a one inch thick 80 durometer rubber sheet over the conductive barrier to protect the conductive barrier; and
   applying pressure of 250 pounds per square inch to the rubber.

7. A method in accordance with claim 1 wherein said adhesive must be capable of maintaining adhesion when exposed to a plurality of electrolytes in a semi fuel cell.

8. A method in accordance with claim 7 wherein said conductive adhesive is a silver epoxy.

9. A method in accordance with claim 1 wherein the step of applying adhesive comprises screen printing the adhesive on to the lands of the pattern on the surface of the metal plate.

10. A method in accordance with claim 1 wherein the step of applying pressure to the conductive barrier mated to the metal plate further comprises:
    placing a one inch thick 80 durometer rubber sheet over the conductive barrier to protect the conductive barrier; and
    applying pressure of 200 pounds per square inch to the rubber.

11. A method in accordance with claim 1 wherein the step of curing the adhesive further comprises curing said adhesive at room temperature.

12. A method in accordance with claim 1 wherein the step of curing the adhesive further comprises curing said adhesive under thermally controlled conditions.

* * * * *